March 1, 1955 E. O. COOK 2,703,185
ONE-PIECE SHEET METAL PIEPAN WITH RADIAL DIVIDERS
Filed Oct. 11, 1951
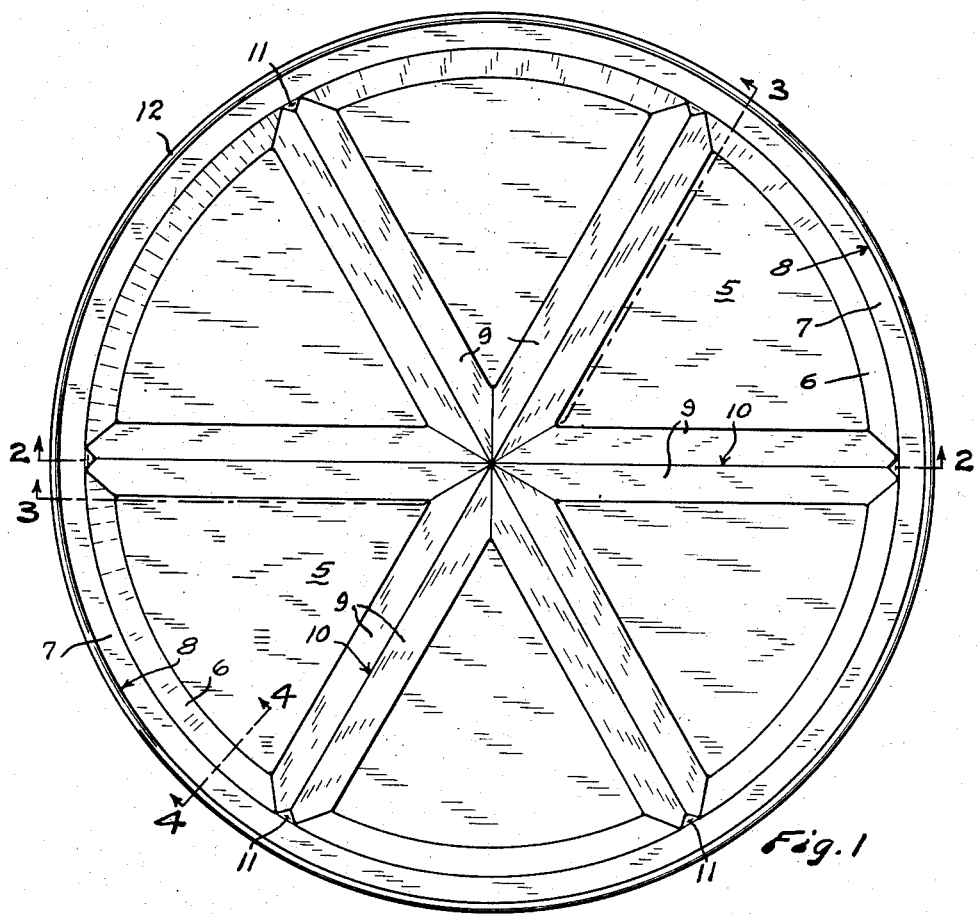
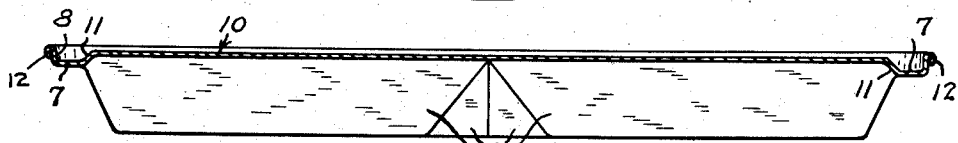
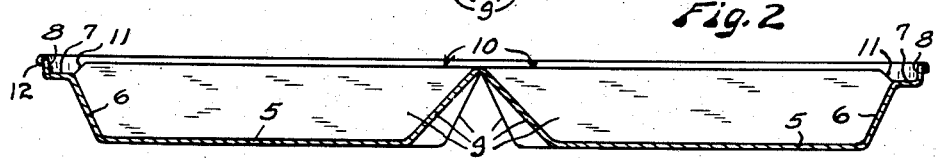
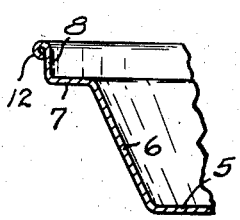
INVENTOR.
Ethel Otis Cook
BY
Fred C. Matheny
ATTORNEY

2,703,185

United States Patent Office

Patented Mar. 1, 1955

2,703,185

ONE-PIECE SHEET METAL PIEPAN WITH RADIAL DIVIDERS

Ethel Otis Cook, Seattle, Wash.

Application October 11, 1951, Serial No. 250,881

2 Claims. (Cl. 220—23.8)

This invention relates to improvements in pie pans.

An object of this invention is to provide a highly efficient and durable pie pan having integrally formed radial dividers therein so that an entire pie formed of a plurality of separate sections or segments can be baked in said pan.

In the construction of pie pans of this type it is highly desirable, in the interest of economy in manufacture, that the pans shall be made of sheet metal and that each pan shall be made of a single piece of sheet metal. The provision of radial separators in a pie pan makes it more difficult to construct the pan of a single piece of sheet metal and it is an object of this invention to provide a pie pan with radial separators which can be made from a single piece of sheet metal by the use of ordinary metal stamping or forming dies.

It is a further object of this invention to provide a pie pan of one piece sheet metal construction having a flat bottom and flaring side walls and having an annular marginal flange extending outwardly from the top edge of the side walls and having a rim upstanding from the circumferential portion of said flange and having radial dividers of inverted V-shape in cross section which terminate in relatively sharp upper edge portions positioned in a plane above the plane of the top surface of the annular marginal flange and below the plane of the top of the upstanding rim, whereby a pie crust in the pan may be rolled thin over the apex portions of the dividers by passing a rolling pin over the top of the pan to leave the crusts efficiently sealed against leakage of the filling both during and after baking and to form weakened lines of crust along which the pie segments will easily and smoothly separate when they are lifted out of the pan.

Other objects of the invention will be apparent from the following description taken in connection with the accompanying drawings.

In the drawings:

Figure 1 is a top plan view of a one piece sheet metal pie pan constructed in accordance with this invention.

Fig. 2 is a sectional view of the same, with parts in elevation, taken substantially on broken line 2—2 of Fig. 1.

Fig. 3 is another sectional view, with parts in elevation, taken substantially on broken line 3—3 of Fig. 1.

Fig. 4 is a fragmentary sectional view on a larger scale than the preceeding figures taken substantially on broken line 4—4 of Fig. 1.

Like reference numerals designate like parts throughout the several views.

The pie pan shown in the drawings comprises a disc shaped bottom wall 5 having a peripherally disposed integral outwardly flared upwardly extending frusto-conical side wall 6. The upper edge of the outwardly flared side wall 6 carries an outwardly directed integral annular flange 7 which is substantially parallel with the pan bottom 5. An upstanding annular rim 8 is integral with the peripheral portion of the flange 7 and preferably terminates in an upper rolled edge portion 12.

A plurality of radially extending dividers 9 of inverted V-shape in cross section are formed integral with the bottom wall 5 and extend from the center of said bottom wall to the outwardly flared side wall 6. The apex or top edge portion 10 of each divider 9 extends above the plane of the upper surface of the annular flange 7 but terminates below the plane of the top of the upstanding rim 8. This provides a pie pan in which the pie crusts which overlie the apex portions 10 are pinched thin but not entirely severed along the lines of said apex portions 10 when a rolling pin is passed over the top of the pan after the crusts and filling have been placed therein. This leaves segments which are sealed all around the edges and will not allow the filling to leak out either in the oven or after the pie has been baked and which will separate or break apart easily and smoothly without requiring any cutting when the segments are removed from the pan.

Small inclined sections 11 of metal of generally triangular shape are formed at the locations where the apex portions 10 of the dividers 9 merge with the annular flange 7. It is the provision of these small inclined metal sections at this particular location which makes it possible and practical to stamp the pans out of sheet metal without breaking the metal at this point and at the same time to have the apex portions 10 of the dividers 9 extend above the plane of the top surfaces of the marginal flange 7 but not across said flange 7. If the apex portions 10 of the dividers 9 were extended across the flange 7 and to the rim 8 they would objectionably weaken the markinal portions of the pan in the vertical planes of the dividers. The trough shaped spaces underneath the dividers 9 are not closed by the side walls 6 but are open at their ends to provide a better and more even heat circulation. This means that the strength afforded by the flange 7 and rim 8 in the medial plane of the dividers is needed to give the pan stiffness and stability in these planes.

In using this pan to bake pies a bottom crust of larger diameter than the pan is spread over the pan and pressed down into each triangular compartment thereof so that it conforms to the shape of the pan and overhangs the upstanding rim 8. Filling is placed in the triangular pockets formed in the bottom crust between the dividers 9. A top crust is preferably placed over the filling and bottom crust and overhangs the upstanding rim 8. A rolling pin is then passed over the top of the pan. This rolling pin presses the top crust down on the filling and rolls both crusts thin and seals them along lines directly above the apex portions 10 of the dividers 9. Also it presses both crusts firmly down on the annular flange 7 and seals them together at the location of this flange 7 and cuts both crusts off on the rolled top edge 12 of the upstanding rim 8.

Pressing the crusts thin on the apex portions 10 of the dividers 9 leaves an efficient seal at this location to prevent leakage of the filling and also insures that the crusts will break cleanly and evenly along these lines when the segments of pie are removed from the pan after baking.

The inclined metal sections 11 which are formed at the locations where the dividers 9 merge with the annular flange 7 can be formed in the stamping operation by which the pan is made without danger of breaking the metal at this location. Also the provision of these inclined sections 11 makes it practical, in manufacture, to extend the apex portions 10 of the dividers 9 a short distance above the plane of the annular flange 7 and to terminate said dividers at the inner edge of the flange 7 without running them across the flange 7.

The foregoing description and accompanying drawings clearly disclose a preferred embodiment of this invention but it will be understood that changes in the same may be made within the scope of the following claims.

I claim:

1. A one piece sheet metal pie pan comprising a substantially circular bottom wall; a flaring side wall extending upwardly and outwardly from the periphery of said bottom wall; an outwardly extending annular flange carried by the upper edge of the side wall and positioned substantially parallel to the bottom wall; an upwardly extending annular rim integral with the outer edge of said annular flange, said rim terminating at its top end in a plane parallel to the plane of the flange; and a plurality of radial dividers of inverted V shape in cross section integral with the bottom wall and the side wall, the apex portions of said dividers extending above the plane of the top surface of said flange but terminating below the plane of the upper edge of said rim and the outer ends of the apex portions of said dividers terminating at the inner edge of the flange and merging integrally with the flange, the portions of said flange between the ends of the dividers and the rim being plane and flat and unobstructed.

2. A one piece sheet metal pie pan comprising a substantially plane circular bottom wall; a plurality of dividers of inverted V shape in cross section integral with said bottom wall and extending upwardly therefrom and radiating outwardly from the center of said bottom wall; flaring side wall sections integral with said bottom wall and said dividers leaving openings at the outer ends of said dividers; an outwardly directed annular flange integral with the outer edge of the side wall sections and with the dividers, the upper surface of said flange being slightly below a plane common to the apex portions of said dividers; inclined integral metal sections connecting the outer ends of the apex portions of said dividers with the inner edge portion of said annular flange, said inclined metal sections reinforcing the structure at the locations where they join the apex portions with the inner edge of the annular flange and facilitating construction from sheet metal of a one piece pie pan and an upstanding annular rim integral with the outer edge portion of said annular flange, the apex portions of said dividers being positioned in a common plane between the plane of the top surface of said flange and the plane of the top of said rim.

References Cited in the file of this patent

UNITED STATES PATENTS

| 608,144 | Porter | July 26, 1898 |
| 956,858 | Kauffmann | May 3, 1910 |
| 1,020,004 | Wishman | Mar. 12, 1912 |
| 1,021,640 | Steitler | Mar. 26, 1912 |
| 1,610,963 | Popper | Dec. 14, 1926 |
| 2,123,359 | Hallmark | July 12, 1938 |